(12) United States Patent
Lowell et al.

(10) Patent No.: US 10,067,253 B2
(45) Date of Patent: Sep. 4, 2018

(54) METHOD FOR DETERMINING SEDIMENTARY FACIES USING 3D SEISMIC DATA

(71) Applicant: FOSTER FINDLAY ASSOCIATES LIMITED, Tyne and Wear (GB)

(72) Inventors: James Lowell, Durham (GB); Hanish Yadav, Sussex (GB); Vitalij Cybulskij, Surrey (GB); Adam Eckersley, Tyne and Wear (GB); Stephen Purves, Santa Cruz de Tenerife (ES)

(73) Assignee: FOSTER FINDLAY ASSOCIATES LIMITED, Tyne and Wear (GB)

( * ) Notice: Subject to any disclaimer, the term of this patent is extended or adjusted under 35 U.S.C. 154(b) by 0 days.

(21) Appl. No.: 15/542,012

(22) PCT Filed: Dec. 14, 2015

(86) PCT No.: PCT/GB2015/053903
§ 371 (c)(1),
(2) Date: Jul. 6, 2017

(87) PCT Pub. No.: WO2016/124878
PCT Pub. Date: Aug. 11, 2016

(65) Prior Publication Data
US 2018/0003839 A1      Jan. 4, 2018

(30) Foreign Application Priority Data
Feb. 6, 2015 (GB) .................................. 1502027.4

(51) Int. Cl.
*G01V 1/00* (2006.01)
*G01V 1/30* (2006.01)
*G01V 1/34* (2006.01)

(52) U.S. Cl.
CPC ............. *G01V 1/302* (2013.01); *G01V 1/345* (2013.01)

(58) Field of Classification Search
CPC ............................. G01V 1/302; G01V 1/345
See application file for complete search history.

(56) References Cited

U.S. PATENT DOCUMENTS

2011/0307178 A1    12/2011   Hoekstra
2014/0278117 A1     9/2014   Dobin et al.

OTHER PUBLICATIONS

Cooke, "We ELI2 12 Prospect Validation Using Geological Expression in an Existing Gas Discovery, Offshore Mozambique" 76th EAGE Conference & Exhibition 2014 (Year: 2014).*

(Continued)

*Primary Examiner* — Krystine E Breier
(74) *Attorney, Agent, or Firm* — Workman Nydegger

(57) ABSTRACT

The present invention describes a method for adaptively determining a plurality of sedimentary facies from 3D seismic data, comprising the steps of (a) generating an attribute volume comprising at least one attribute from said 3D seismic data; (b) generating at least one frequency decomposition color blend volume from said 3D seismic data; (c) generating a data volume comprising at least one geological object utilizing data from said attribute volume and said frequency decomposition color blend volume; (d) generating a facies classification model dataset for a predetermined region of interest of said 3D seismic data applying a probabilistic algorithm and utilizing data from said geobody volume and said frequency decomposition color blend volume; (e) selectively adjusting at least one first model parameter, so as to optimize said facies classification model dataset in accordance with a conceptual geological model; and (f) selectively providing said facies classification model dataset in a representative property model of said region of interest of said 3D seismic data.

10 Claims, 13 Drawing Sheets

(56) References Cited

OTHER PUBLICATIONS

International Search Report and Written Opinion for application No. PCT/GB2015/053903 dated on Mar. 2, 2016.
Search Report under Section 17 for application No. GB1502027.4 dated Jul. 14, 2015.
International Preliminary Report on Patentability for application No. PCT/GB2015/053903 dated May 29, 2017.
N. Cooke et al: "Prospect Validation Using Geological Expression in an Existing Gas Discovery, Offshore Mozambique", 76th EAGE Conference & Exhibition 2014, Jun. 16, 2014 (Jun. 16, 2014), pp. 16-19.
Kisin Sonja et al: "Seismic facies analysis of a Middle Miocene turbidite reservoir: Marlin field example", SEC International Exposition and 74th Annual Meeting, 2004.
Chaves et al: "Visualization of Geological Features Using Seismic Volume Rendering, RGB Blending and Geobody Extraction", 12th International Congress of the Brazilian Geophysical Society, 2011, pp. 848-850.
Das Ujjal et al: "Application of Multi-Attributes and Spectral Decomposition with RGB blending for understanding the strati-structural features: A Case study", 10th Biennial International Conference and Exposition, 2013.

* cited by examiner (a)

(b)

(c)

(d)

(a)
 (b)
 (c)
 (d)

(a)                    (b)

METHOD FOR DETERMINING SEDIMENTARY FACIES USING 3D SEISMIC DATA

The present invention relates generally to the field of oil and gas exploration, and in particular to the field of computer aided exploration for hydrocarbons using geophysical data, such as for example seismic data, of the earth. Even more particular, the present invention relates to the characterisation and mapping of sedimentary facies in 3D seismic data.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1, for example, shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (2D, 3D) of the substrata.

Typical seismic traces of the reflections (amplitudes) are shown in FIG. 2. The data shown in FIG. 2 has been migrated ("poststack"), i.e. the amplitudes of the traces are moved to their true subsurface position (depth) to eliminate any offset between the source and receiver. Thus, the post-stack seismic reflectivity data comprises of a processed acoustic record of subsurface reflections occurring at many different points within the earth's subsurface. In the field of oil and gas exploration and production, specially trained geoscientists would then interpret images of this poststack data in order to develop a model of the subsurface mapping geological features based on the shape and extent of the reflectors within the dataset.

However, the seismic signal is a rich source of information on the subsurface containing much more information than can be visually assessed from these poststack sections alone. Consequently, computational approaches to seismic interpretation have become more important in recent years in order to allow more of this information to be extracted and made available for interpretation.

One of the challenges of the interpreter(s) is to try and replicate known or conceptual geological features that are presumed to be present in the subsurface. Examples of known or existing depositional systems are illustrated in FIG. 3 (a), (b) and (c). The geomodel may then help to more accurately predict the implications of the geological features in potentially being proven hydrocarbon reserves of commercial value. Here, seismic facies interpretation plays a significant role in the initial basin exploration, prospect evaluation, reservoir characterisation, and ultimately, field development. A seismic facies is a stratigraphic unit or region that has a characteristic reflection pattern distinguishable from those of other areas.

Initial technology used for seismic facies analysis and mapping was a manual process where the seismic interpreter makes visual decisions about the character of the seismic reflection data within a region of interest (ROI) and plots these on a map. The seismic facies are then used to interpret the distribution of litho-facies and rock properties. Recently, stochastic reservoir modelling has gained in popularity due to its ability to constrain the model based on a variety of reservoir data. The data used to constrain the reservoir model are primarily classified into two categories, 'hard data' and 'soft data'. Hard data includes data that is measured in wells, i.e. well log data, and which is considered to be accurate information at a particular location. Soft data includes seismic data and any attributes derivable from, for example, a 3D seismic data. Seismic attributes may include envelope amplitude, phase, frequency, impedance, coherence, azimuth and dip, as well as, curvature and spectral decomposition. FIG. 4 illustrates (a) a 3D seismic data volume and different examples of attribute volumes, such as, (b) RMS amplitude, (c) sweetness and (d) frequency decomposition colour blending. Each of the attributes can be used to highlight different aspects of the subsurface ROI, therefore, allowing the interpreter to determine a more accurate prediction of geological features within the ROI.

Referring now to FIG. 5, an example of a typical well log data driven approach is illustrated. Here, the interpreter would (i) interpret the well data log 24 to determine a facies type 26 within its geological context; (ii) perform a data analysis to identify the trend(s) of the data; (iii) upscale the information into a computational cell frame 28 (e.g. within a Geo Modelling software package); (iv) utilise a modelling algorithm to determine/interpolate any values 30 away from the upscaled facies 32 of the well log data, and (v) tie the values to any additional data source, such as seismic attributes or trends. This process is very time consuming and can take weeks or even months to complete. Also, some facies that can be interpreted at the well location may be too complex to attempt to model (see FIG. 3) away from the well.

Furthermore, there is the additional risk associated with the upscale of well log information, since the averaging methods can distort the data value used to populate a cell in the computational cell frame (see (iii)). Consequently, well log data representations in a geomodel may not always be absolute.

FIG. 6 illustrates some of the most common approaches in currently available modelling software packages. The common methods may include:

(a) Kriging, which is a deterministic method of interpolation for which the interpolated values are modelled by a Gaussian process governed by prior covariance;

(b) Sequential indicator simulation, which is a pixel-based method that assumes that the variable is a realisation of a continuous (Gaussian) random function;

(c) Object-based modelling, where the algorithms of a Boolean model generate spatial distributions of sedimentary bodies (e.g. channels, crevasse splays, reefs) whose parameters (e.g. orientation, length, width) can be inferred from the assumed depositional model, seismic data etc.; and (d) Multi point statistics (MPS), which relies on the concept of training images to essentially produce geometry based images of every feature to be modelled. For example, the image in FIG. 3 (b) would require five zones and more than ten geometries to train the algorithm.

However, these currently available software packages rely on well log data driven algorithms once the information has been upscaled from the well logs. Often, the results are statistically correct at the actual well location, but achieving the correct shapes and distribution of known geological features can be challenging. Also, many modelling software packages rely on geometry based shapes that are not suitably adapted to tie in with well log data or seismic data. As a result, and in order to address the risks associated with such models, thousands of integrations and model versions are processed, constantly updating the generated models with new well log information (e.g. from newly drilled wells).

Summing up, currently available facies classification methods are generally very time consuming, provide limited to sparse data that is eventually tied back to seismic data, may generate unrealistic results, requires many integration steps and/or model versions making the methods resource heavy, and do not utilise the best source data.

Accordingly, it is an object of the present invention to provide a method and system that is adapted to provide seismic driven facies classification at an improved resolution and geologically realistic accuracy.

SUMMARY OF THE INVENTION

Preferred embodiment(s) of the invention seek to overcome one or more of the above disadvantages of the prior art.

According to a first aspect of the invention there is provided a method for adaptively determining a plurality of sedimentary facies from 3D seismic data, comprising the steps of:
(a) generating an attribute volume comprising at least one attribute from said 3D seismic data;
(b) generating at least one frequency decomposition colour blend volume from said 3D seismic data;
(c) generating a data volume comprising at least one geological object utilising data from said attribute volume and said frequency decomposition colour blend volume;
(d) generating a facies classification model dataset for a predetermined region of interest of said 3D seismic data applying a probabilistic algorithm and utilizing data from said geobody volume and said frequency decomposition colour blend volume;
(e) selectively adjusting at least one first model parameter, so as to optimise said facies classification model dataset in accordance with a conceptual geological model;
(f) selectively providing said facies classification model dataset in a representative property model of said region of interest of said 3D seismic data.

The method of the present invention provides the advantage of retaining the resolution of the original 3D seismic data in the time domain (i.e. vertical resolution), which significantly improves the ability to define the facies classification sample area more accurately. In particular, the frequency decomposition colour blend volume (HDFD) allows geological features to be "illuminated" within the seismic data, therefore, providing substantially improved "vertical" (i.e. in the direction of the time domain) resolution that results in a much more accurate representation of any geological feature (e.g. channel structure). When combining the information provided by the HDFD volume with, for example, an adaptive geobody volume to constrain a seismic driven multi attribute facies classification (e.g. GeoTeric's IFC+), it is possible to produce high resolution facies very rapidly (i.e. in a matter of hours rather than months) compared to the time required in currently available facies classification methods.

Furthermore, an accurate facies representation can be generated in exploration models, even when there is limited or no well log data, while honouring the geologically conceptual expectation and remaining deterministic.

The method of the present invention further provides the advantage to directly utilise the best data source for the subsurface ROI.

When using the generated facies classification model dataset of the method of the present invention in a commercial software platform (e.g. a Geo Modelling Package), a finer grid resolution within the geological feature can ensure that classification and shape are preserved from the 3D seismic volume. Thus, the method of the present invention allows establishing the potential heterogeneity within a geological target feature at an improved efficiency, selectively utilising only information made available from the 3D seismic data.

Advantageously, step (d) may further include selectively utilising at least one predetermined constraint at, at least one predetermined position within said predetermined region of interest. Preferably, said at least one predetermined constraint may comprise at least one first well log dataset spatially corresponding to and adapted to be interlinked with respective data of said geobody volume. Even more preferably, said at least one first well log dataset may comprise a plurality of first well marker adapted to define predetermined time-domain intervals and/or lateral intervals with respect to a subsurface within said region of interest.

Advantageously, said facies classification model dataset may be sampled at a time-domain resolution corresponding to the time-domain resolution of said 3D seismic data. Preferably, step (c) may further includes selectively altering said at least one attribute of said attribute volume, so as to optimise the visual representation of said geobody volume.

Advantageously, said at least one first model parameter may be an acceptance threshold and/or a number of predefined sub-facies. Preferably, said at least one geological object may be any one or any combination of a geobody, a horizon, a fault, and any other suitable planar geological feature derivable from said 3D seismic data. Even more preferably, said probabilistic algorithm may comprise any one of a Gaussian Mixture Model, Akaike Information Criterion and Hierarchical Clustering.

Advantageously, said representative property model in step (f) may comprise a cellular frame at a resolution corresponding to the resolution of said facies classification model dataset.

According to a second aspect of the invention there is provided a computer system for adaptively determining a plurality of sedimentary facies from 3D seismic data by a method according to the first aspect of the present invention.

According to a third aspect of the invention there is provided a computer readable storage medium having embodied thereon a computer program, when executed by a computer processor that is configured to perform the method of the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

For purposes of explanation, it should be appreciated that the terms 'determine', 'calculate' and 'compute', and variations thereof, as used herein are used interchangeably and include any type of methodology, process, mathematical operation or technique. The terms 'generating' and 'adapting' are also used interchangeably describing any type of computer modelling technique for visual representation of a subterranean environment from geological survey data, such as 3D seismic data. In addition, the terms 'vertical' and 'horizontal' refer to the angular orientation with respect to the surface of the earth, i.e. a seismic data volume is orientated such that 'vertical' means substantially perpendicular to the general orientation of the ground surface of the earth (assuming the surface is substantially flat), and 'horizontal' means substantially parallel to the general orientation of the ground surface of the earth. In other words, a seismic data volume is therefore in alignment with respect to the surface of the earth so that the top of the seismic volume is towards the surface of the earth and the bottom of the seismic volume is towards the centre of the earth. In addition, the term 'time domain' may also define the vertical direction of the seismic traces with regards to the surface of the earth, whereas the term 'lateral' may refer to a horizontal displacement with regards to the to surface of the earth. Furthermore, the term 'atom' is generally known by the person skilled in the art and refers to an adapted wavelet from a dictionary of wavelets to generate an analytical model function.

Figure 1:
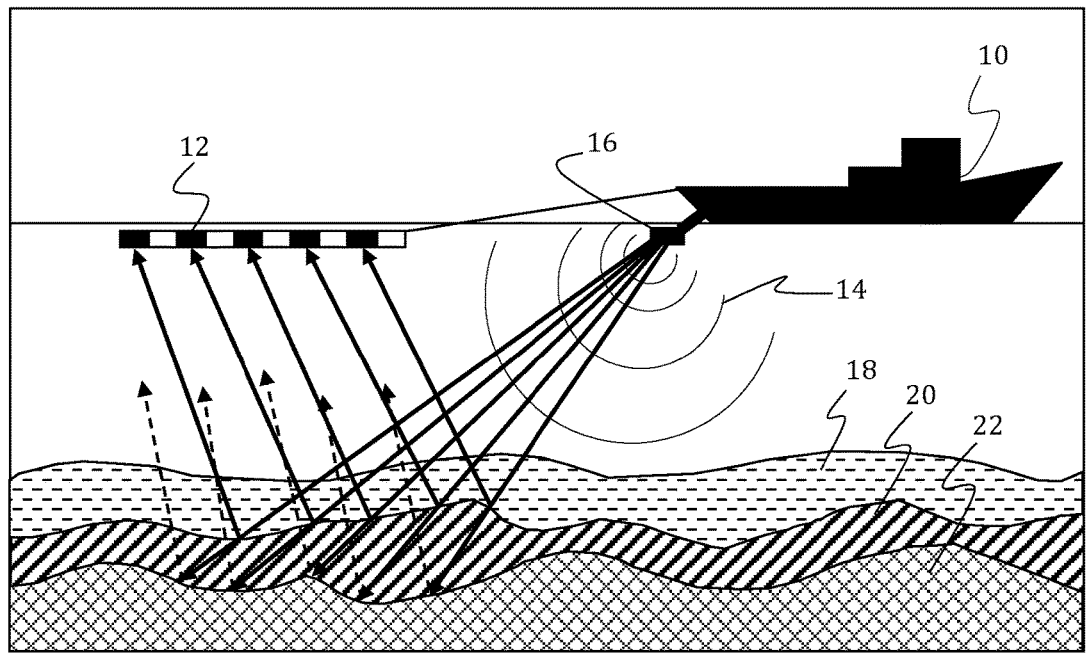
FIG. 1 shows a typical setup for an offshore seismic survey using an array of acoustic receivers (i.e. hydrophones) and sound waves generated by an air gun.
Figure 2:
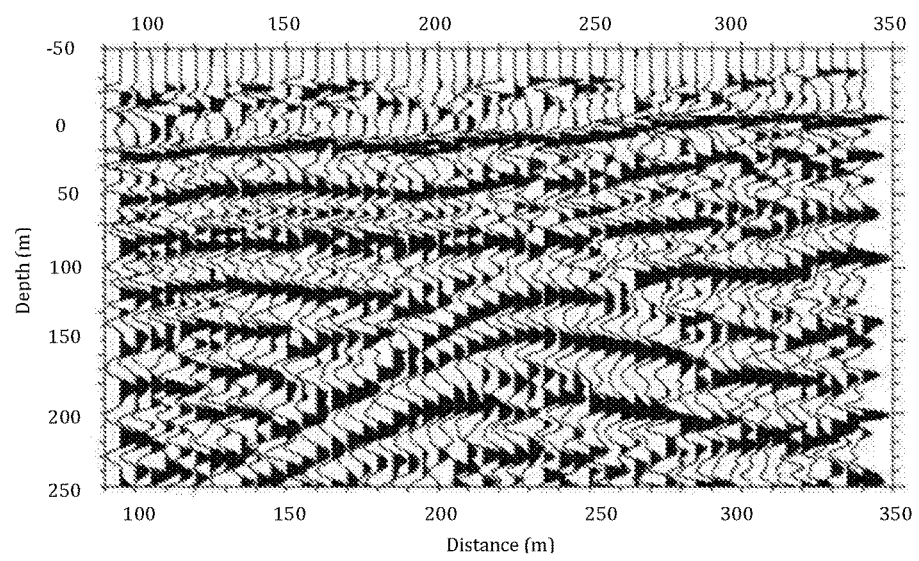
FIG. 2 shows a typical plot of migrated reflection traces recorded by the acoustic receivers after activating the air gun.
Figure 3:
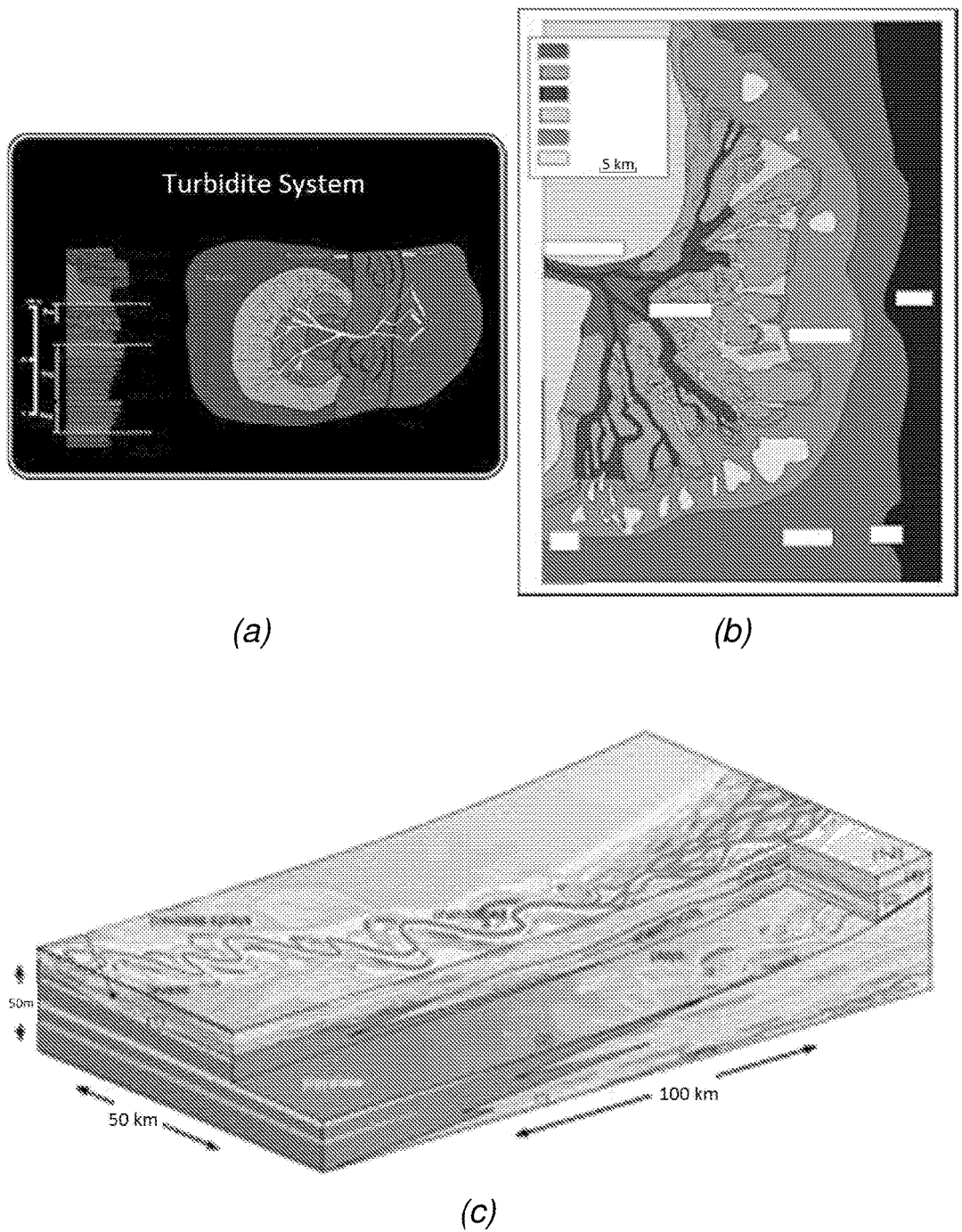
FIG. 3 shows example illustrations of known sedimentary deposition systems, such as, (a) Turbidite system, (b) River-delta system and (c) Channel system.
Figure 4:
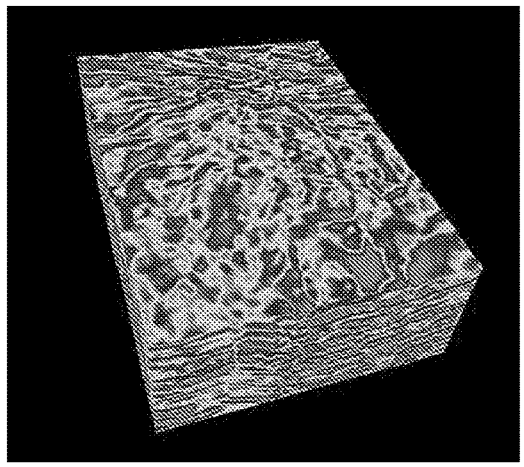
FIG. 4 shows examples of seismic data attribute volumes, such as, (a) post-stack seismic data, (b) RMS amplitude attribute volume, (c) "sweetness" attribute volume and (d) HDFD colour blend volume.
Figure 4:
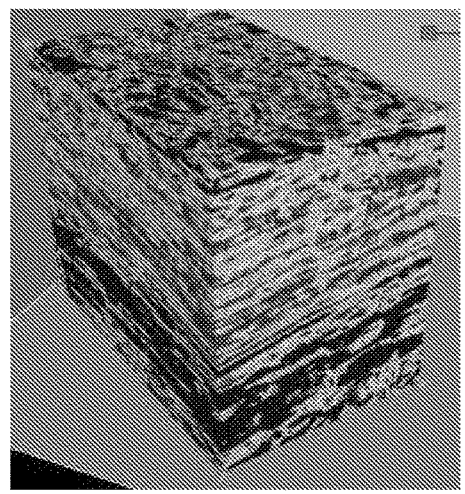
Figure 4:
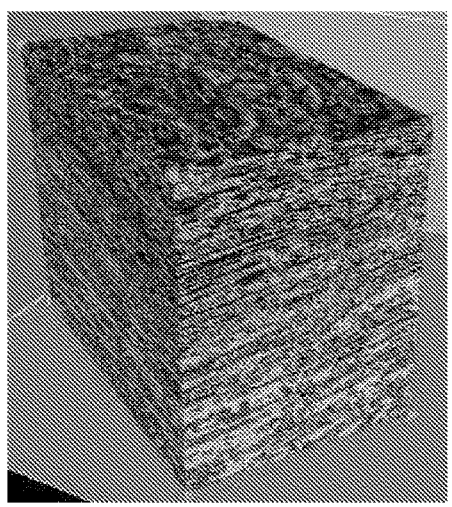
Figure 4:
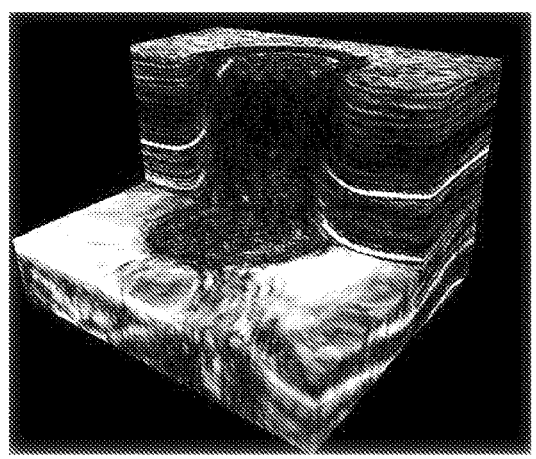
Figure 5:
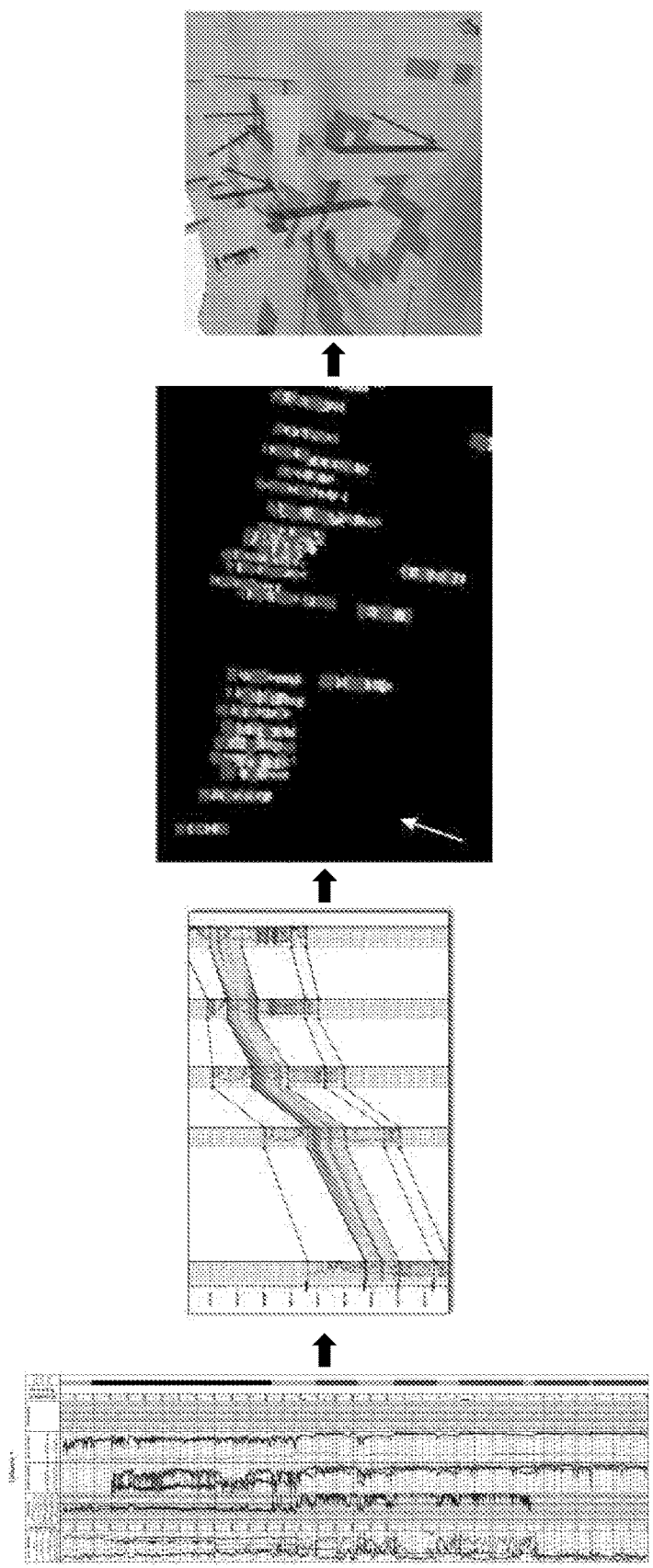
FIG. 5 shows an illustration example of a conventional facies modelling method utilising well log data to interpolate facies classification away from the well locations.
Figure 6:
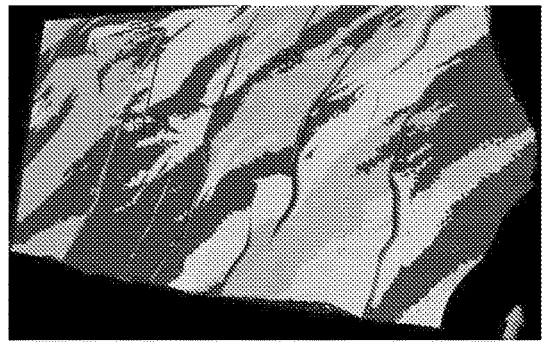
FIG. 6 illustrates examples of traditional deterministic and stochastic methods for modelling facies distribution, (a) Kriging, (b) Sequential indicator simulation, (c) Object modelling, and (d) Multi point statistics.
Figure 6:
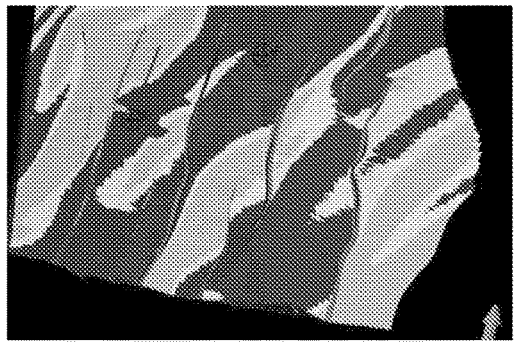
Figure 6:
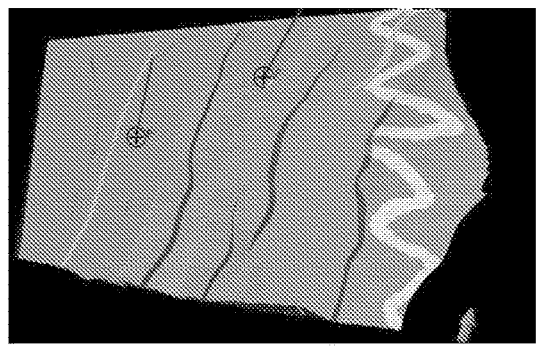
Figure 6:
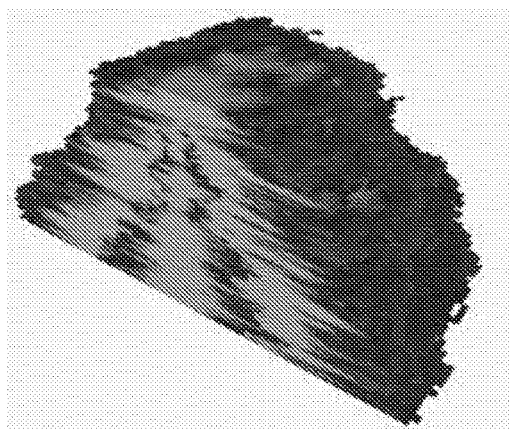
Figure 7:
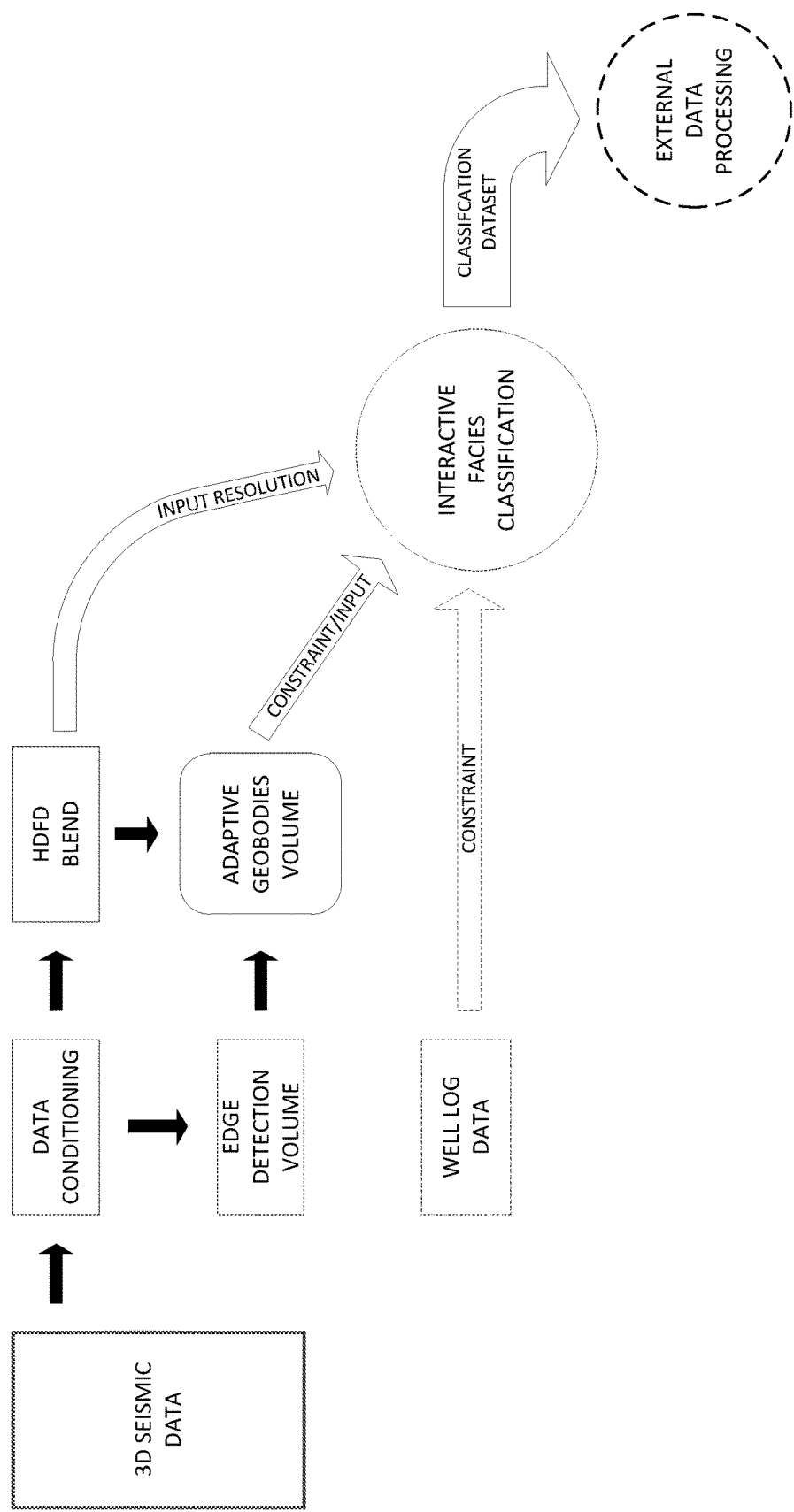
FIG. 7 shows a simplified flow diagram of the method of the present invention, utilising, for example, an adaptive geobody volume as input for the facies classification.

Referring now to FIG. 7, a representative example of the method is described by way of a functional flow block diagram. In the method of the present invention an initial data-conditioning step 102, such as noise cancellation, is performed on a 3D seismic data 100. The noise cancelled 3D seismic data volume is then used to generate a high-definition-frequency-decomposition (HDFD) colour blend volume 104 and an Edge Detection Volume 106.

Figure 8:
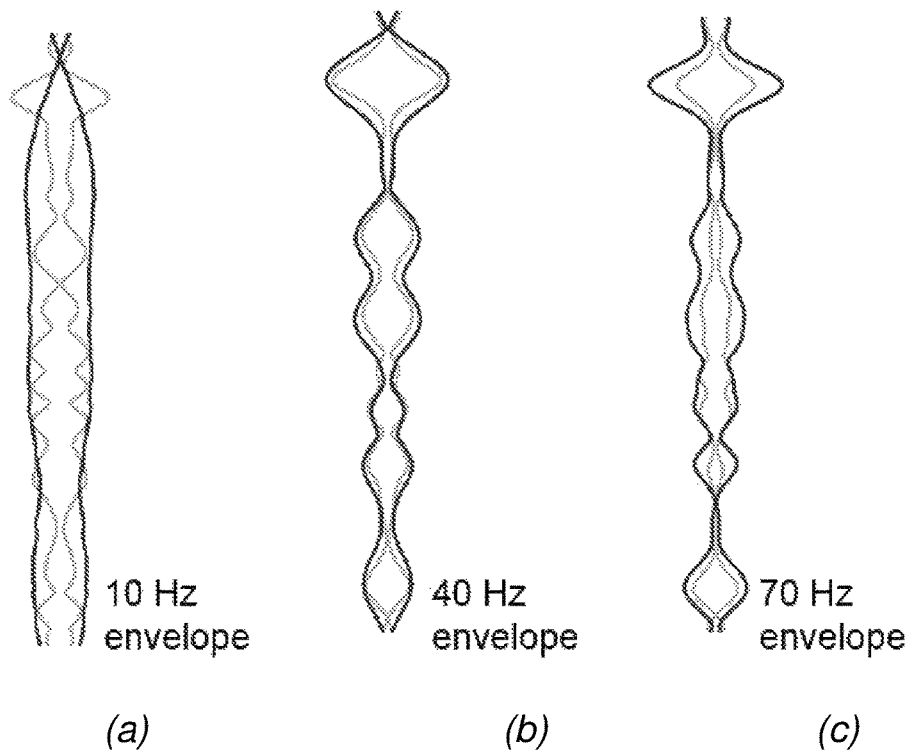
FIG. 8 shows an illustration of matching seismic traces using a dictionary of wavelets (HDFD) compared to standard frequency decomposition technique using Constant Q.

A brief summary on the generation of HDFD volumes is described in "Appendix-I" and "Appendix-II", and a more detailed description of HDFD volumes can be found in the international patent application WO2015/004416. In particular, a gain in resolution within the HDFD volume is achieved by utilising a predetermined dictionary of wavelets ('atoms') to match each seismic trace much more accurately compared to standard frequency decomposition techniques (e.g. ConstantQ). FIG. 8 illustrates a matching example of a seismic trace at three different frequencies, (a) 10 Hz, (b) 40 Hz, (c) 70 Hz, using wavelets 32 and ConstantQ 34.

Figure 9:
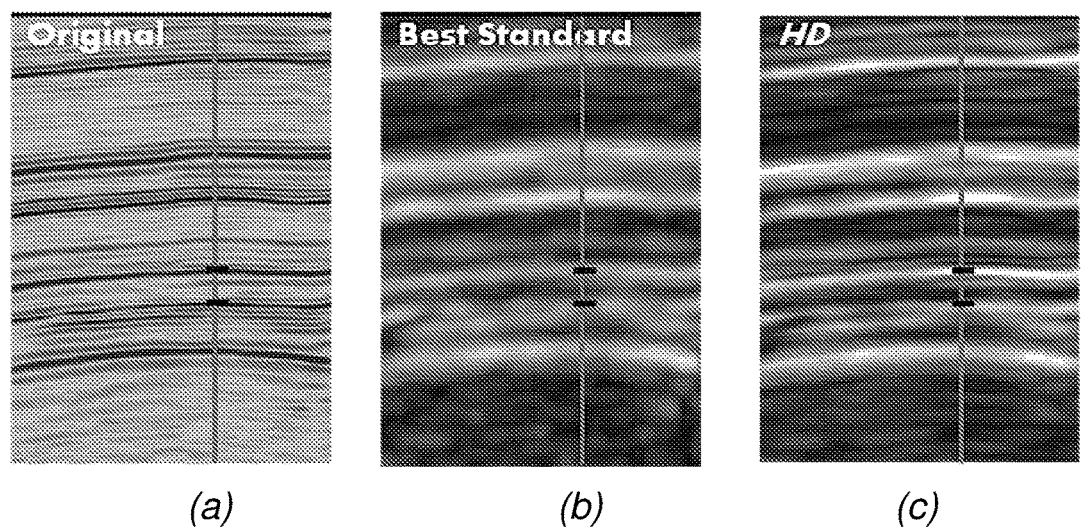
FIG. 9 illustrates the difference in resolution between the original seismic, a standard frequency decomposition (Constant Q) and a HDFD.

FIG. 9 shows a comparison of 2D slices of (a) the original seismic (horizons), (b) a standard frequency decomposition (ConstantQ) and (c) the HDFD method utilised with the method of the present invention. It is clearly noticeable that the HDFD provides a substantially improved resolution of detail in the image.

The principle of "RGB colour blends" are well known in the art (see, for example, PETEX 2012: "An investigation into the dependence of frequency decomposition colour blend response on bed thickness and acoustic impedance: results from wedge and thin bed models applied to a North Sea channel system and is therefore not described in any more detail in this application." McArdle, Ackers, Paton).

Figure 10:
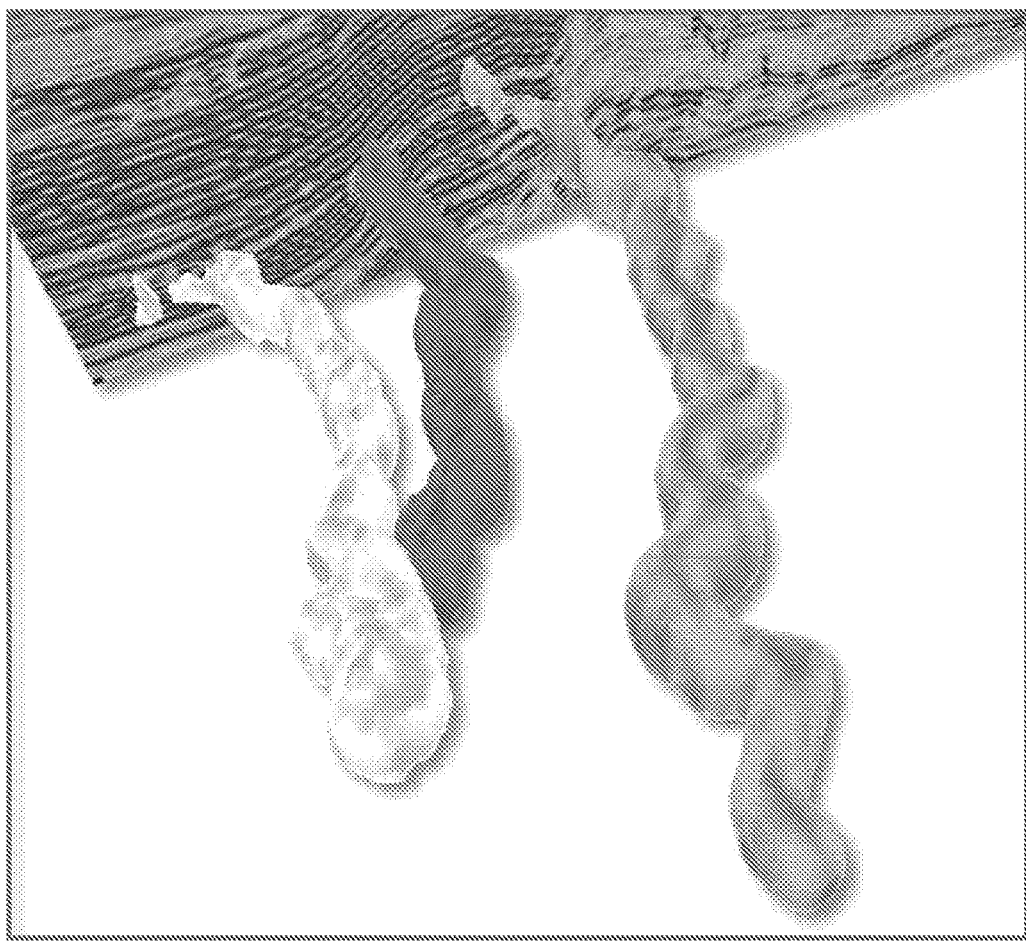
FIG. 10 shows an illustration example of an adaptive geobody (e.g. channels) generated from 3D seismic volume.

Referring now back to FIG. 7, the HDFD colour blend volume 104 and Edge detection volume 104 are used as data input for an adaptive geobody process generating a geobody volume 108. Illustrated examples of geobodies 202, 204, 206 are shown in FIG. 10.

The generation of adaptive geobodies is well known in the art (e.g. ffA Poster GEO 2012: "Adaptive Geobodies: Extraction of complex Geobodies from multi-attribute data using a new adaptive technique", or, GCSSEPM Dec. 2011, ffA Paper: "Advanced Multiattribute Imaging and Geobody Delineation of Jurassic and Triassic Stratigraphic Targets", or, European Patent No. EP2659291) and not discussed in any further detail in this application.

The geobody volume 108 and the "vertical" resolution, provided by the HDFD colour blend volume 104, are then fed into an interactive facies classifier 300 such as, for example, GeoTeric's IFC+ system, where the HDFD colour blend volume 104 and adaptive geobody volume 108 are used as constraints within the geobody.

Alternatively, and in addition to the HDFD colour blend volume 104 and adaptive geobody volume 108, suitable well log data 110 and well markers at predetermined locations along the well may also be used as constraints within the geobody. Consequently, it is possible to include one or more well marker to tie respective seismic data into the well. The voxels generated between two consecutive well markers may be used to generate a representative voxel sample that is fed into the hierarchical clustering method and the Gaussian Mixture Model (GMM) (see below). The voxels between the two well markers are taken from the HDFD colour blend volume, which has a greater vertical resolution than other commonly available frequency decomposition techniques, therefore providing a finer stratigraphic layering.

Optionally, an acceptance threshold and facies count may be adjusted by the user (based on a conceptual understanding), in order to further optimise the facies classification dataset generated by the facies classifier 300 (e.g. GeoTeric's IFC+). In particular, the constraint of specifying the number of facies (Facies count) detected in the facies classifier (e.g. IFC+) allows the user to control the preconceived conceptual idea of the facies system of interest. I.e. it is possible to restrict or enhance the level of complexity based on what has been revealed in the previous stages of the workflow using colour blends. The level of acceptance (acceptance threshold) and complexity can therefore be parameterised during the procedure. Thus, it is possible to produce geologically aesthetic results without simplification or loss of input data required for the geological model.

The generated facies classification dataset may then be used as data input for an external data processing system (e.g. geo modelling package) to produce a representative property model of the reservoir. When using another commercially available Geo Modelling Package, both, the model and data volume should preferably be in the same domain.

Following, the function of an example facies classifier (e.g. GeoTeric's IFC+) is described in more detail.

Figure 11:
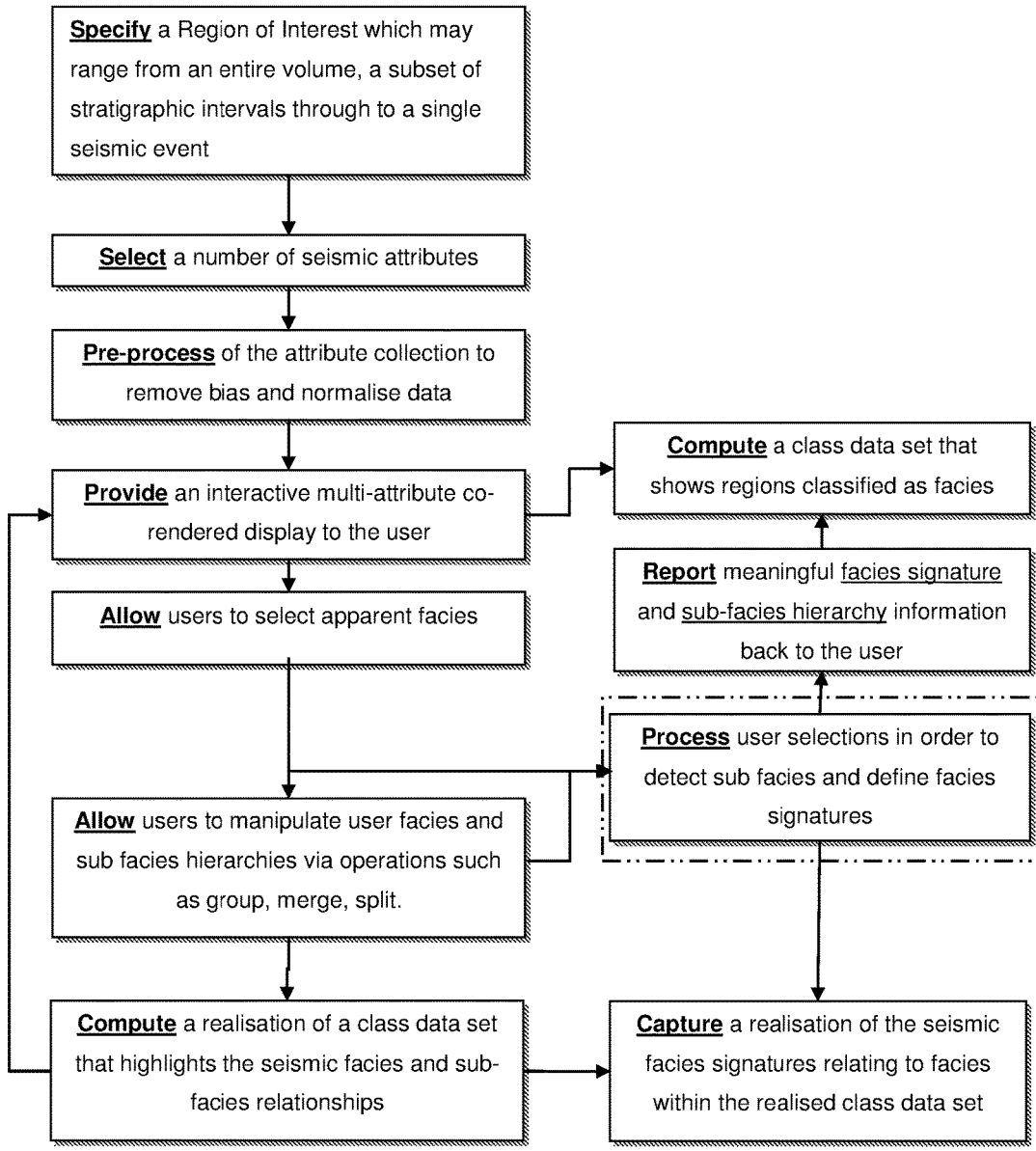
FIG. 11 shows a facies classifier (IFC+) process flow chart.
Figure 12:
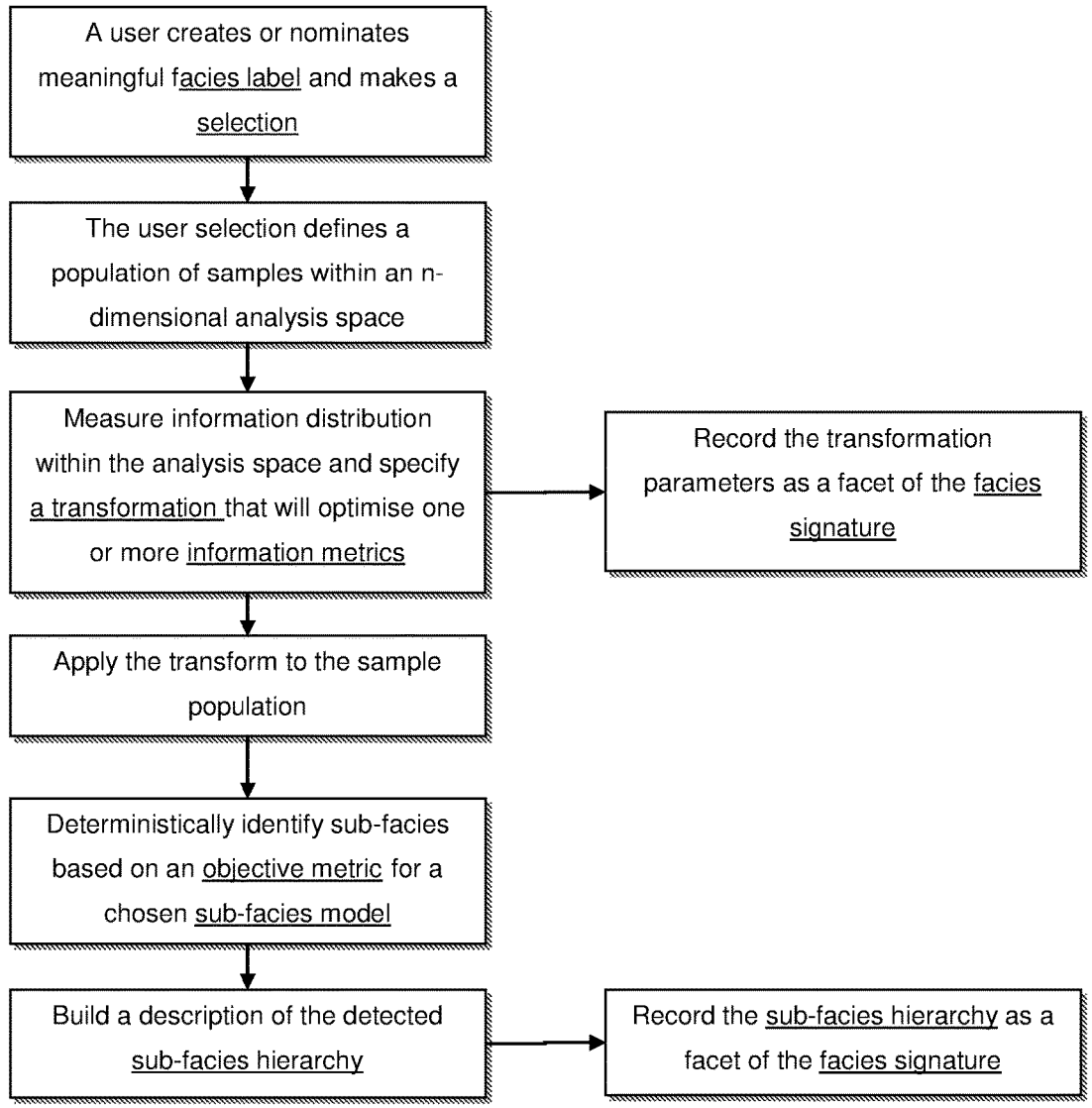
FIG. 12 shows a flow chart of the automatic detection of sub-facies.

IFC+ System—Mode of Operation, when Used with the Method of the Present Invention:

The main process flow diagram of the data processing method applied in the facies classifier 300 (e.g. IFC+) is disclosed in detail in FIG. 11. A sub-process flow diagram for the sub-step 302 of detecting sub-facies and creating facies signature(s) is disclosed in detail in FIG. 12.

The data output generated by the facies classifier 300 may be of the same type/dimension/nature as the data input, i.e. using a 3D data volume as an input will result in new 3D data volumes as outputs. The facies signatures may be output in the form of a compact mathematical description, which may include transformation model(s) and parameter(s), graph(s) (in the mathematical sense) and appropriate statistical model(s) of the sub-facies.

To illustrate the operations applied to generate facies and/or sub-facies classification of a predetermined sample, a detailed step-by-step example of the algorithm(s) is now provided.

Operation Example of Algorithm:

In each case, data samples are generally treated using the following steps:

(i) a labelled facies is created and the selected samples set is associated with the labelled facies;

(ii) Hierarchical cluster analysis is performed on the sample set;

(iii) an optimal sub-facies grouping is determined using a Gaussian Mixture Model (GMM) and an Akaike Information Criterion (AIC);

(iv) a classified volume is generated using a set of Probability Density Functions (PDF's) associated with each of the labelled facies, using a unique but related class label for each of the sub-facies.

Steps (ii) to (iv) are now discussed in more detail.

Step (ii)—Hierarchical Clustering

Hierarchical clustering is a "bottom-up" process, where each data point is considered initially as its own cluster. The clusters are then assessed and merged into larger clusters based on predetermined scoring mechanisms until a single cluster is reached. The hierarchical clustering process includes:

Each data point begins as its own cluster.

Iterate over all clusters until only one cluster remains.

At each iteration, the two clusters considered to be the closest together are merged to form a larger cluster.

A Distance Metric is used to determine the proximity of two clusters; IFC+ uses a metric, based on the Euclidean Distance between all points in each data cluster.

$$D(C_1, C_2) = \Sigma_{0<n<N} \Sigma_{0<m<N} E(\overline{C_1(n), C_2(m)});$$

where $C_1(n)$ is a vector representing the $n^{th}$ sample from the $i^{th}$ cluster, and $E(\ )$ is the Euclidean distance between two vectors $E(a, b) = \sqrt{\Sigma_i (a_i - b_i)^2}$.

In practice, a matrix of all cluster distances is built at the start of the iterative process. This is used and updated as the clustering process proceeds. During each update pass, a new cluster is created and the two "children" are removed. As subsequent clusters are added, the number of data points in each cluster is used to weight the distance linkage score. For each, the link between the new cluster $C_1$ and the linked cluster $C_2$ is as follows:

$$D_{weighted}(C_1, C_2) = \frac{N\{C_1\} * D(C_1, C_2)}{N\{C_1, C_2\}};$$

where $N\{\ \}$ is the number data points in the cluster(s).

Overall, this results in a weighted-average-linkage behaviour.

Figure 13:
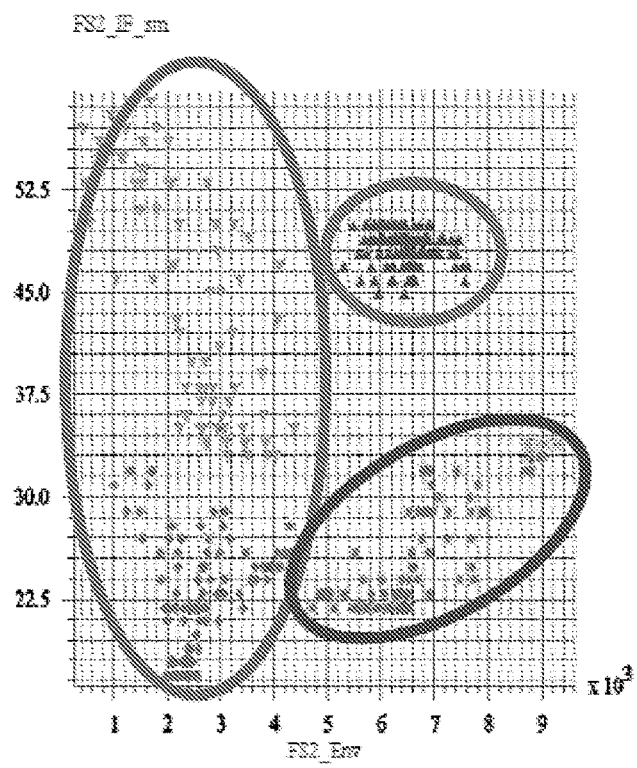
FIG. 13 shows an example attribute cross plot comparing different facies (e.g. channel core, deposits, back fill) classifications.
Figure 14:
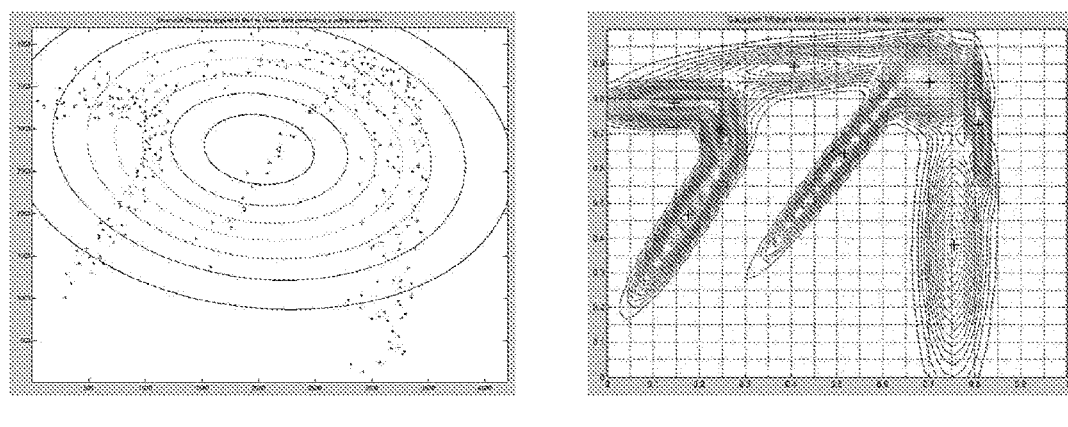
FIG. 14 shows an example of (a) a 2D attribute cross plots point distributions relating to a sample population of data from a multi-attribute co-rendered display, the contours show the probability distribution function assigned by a Bayesian classifier using single seismic facies model contours, (b) the contours show the probability distribution function assigned by sub-facies mapping with 8 sub-facies.

FIG. 13 shows an example attribute cross plot comparing data clusters of different facies (e.g. channel core, deposits, back fill) classifications. FIG. 14 shows an example of (a) a 2D attribute cross plots point distributions relating to a sample population of data from a multi-attribute co-rendered display, the contours show the probability distribution function assigned by a Bayesian classifier using single seismic facies model contours, (b) the contours show the probability distribution function assigned by sub-facies mapping with 8 sub-facies.

Step (iii)—Select Optimal Sub Facies Grouping

Figure 15:
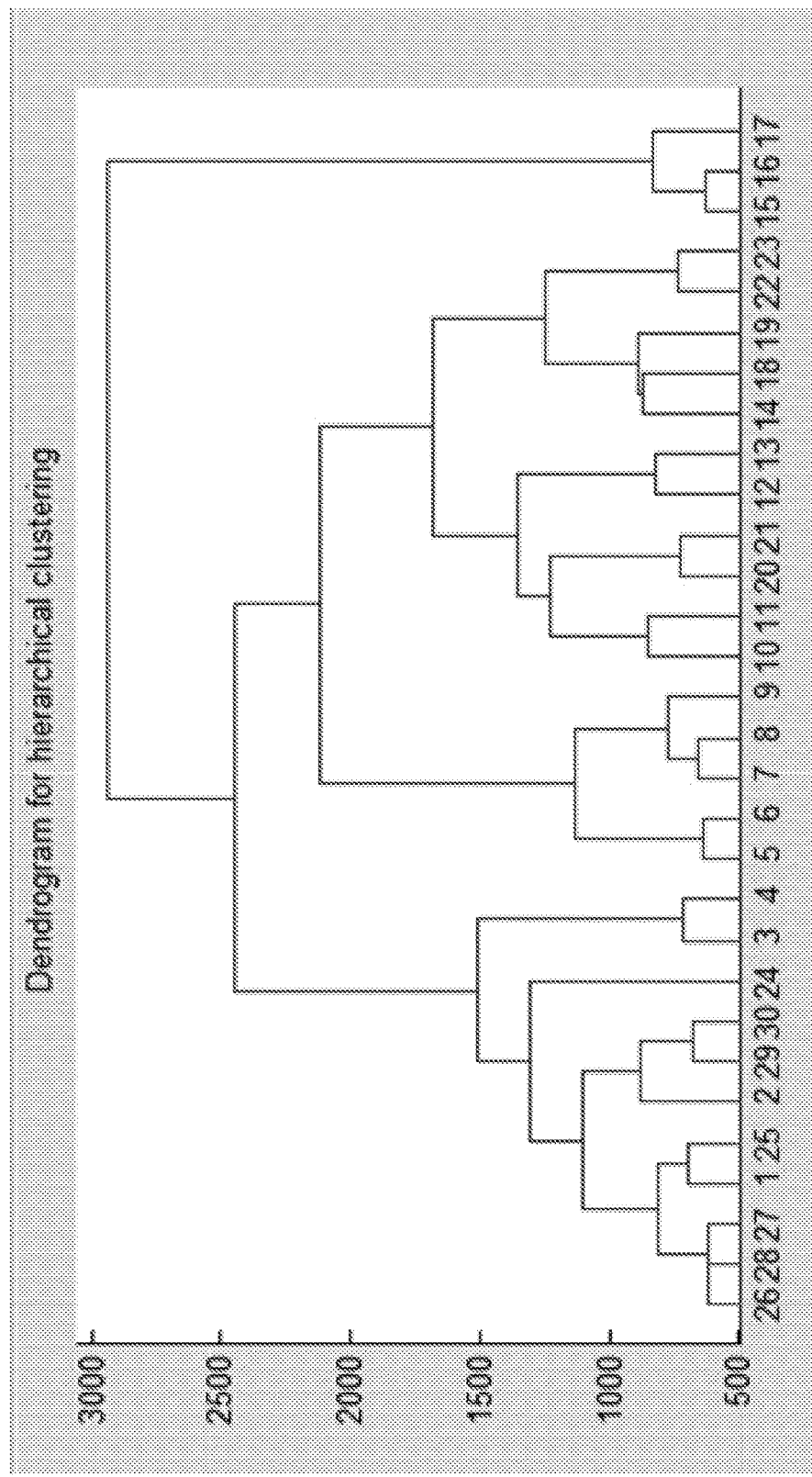
FIG. 15 shows an example of a Dendrogram for hierarchical clustering of the facies.

At the end of the hierarchical clustering pass, all data points in the input sample sets have been clustered. The resulting hierarchical relationships are known and can be readily represented, queried and used to manipulate and group the data within the sample set. A Dendrogram of the sample set, as shown in FIG. 15, is a useful tool for visualising the cluster tree produced.

The Dendrogram illustrates the problem of selecting a meaningful number of clusters with which to represent the data within the sample set. In the IFC+ system, the purpose of clustering the user selected sample sets is to uncover the underlying relationships within the user selection. It can be shown, whether the user has selected a labelled facies that is compactly represented in the space of the input attributes, or if that selection is represented by a number of clusters (i.e has the user highlighted an object that is a composite of a number of clusters, or sub-facies?).

This unsupervised phase is intended to provide a way for users to understand how the attribute data they are using relates to the facies/object they have selected and labelled.

A modified form of the Akaike Information Citerion (AIC) is used to determine the number of sub-facies present in the sample set.

Standard AIC is: AIC=$2k-2 \ln(L)$;

Modified AIC is: IC=$k-2 \ln(L)$;

Optional AIC is: IC=$mk-2 \ln(L)$;

Here, k is the number of sub-facies, and L is the likelihood derived from the GMM for that number of sub-groups. The AIC was modified during testing on seismic attribute data to reduce the number of instances, where the algorithm selected a single facies group. In the optional AIC, the user is provided with a modification factor m. In practice, the IFC+ algorithm uses Gaussian Mixture Models (GMMs) and the modified AIC in tandem, as follows:

In Psuedo-Code:
1. For each branch level in the cluster hierarchy.
  (a) Generate a GMM based from the identified clusters;
  (b) Calculate the AIC score;
2. Select sub-facies grouping with lowest AIC score.

The IFC+ allows the user to adjust the number of sub-groups in order to explore the relationships within the data. The sub-groups determined through using the AIC are offered as the default grouping. Optionally, a predetermined geological knowledge could be embedded to bias the generation of the hierarchical tree of the Dendrogram. Alternatively, the user may be allowed to manually select the grouping of the sub-groups, or limit the splitting of predetermined sub-facies. In particular, the user may decide which subgroups of facies are split and/or need further splitting.

Step (iv)—Classification

The algorithm in step (iii) generates a unique PDF for each facies sub-group. By combining the PDF's for each of the sub-groups, overall mixture PDF is constructed representing the labelled facies to which the sub-groups belong.

In the facies classifier IFC+, a Bayesian Classifier is used to produce the classified output volume, where each sub-group is considered as a separate class. This Bayesian Classifier is a standard second order Bayesian Classifier, where the probability p($\underline{x}|\omega_j$) that a given voxel vector across each channel is a member of class $\omega_j$ defined by a given selection group is:

$$p(\underline{x} | \omega_j) = n(j) e^{\frac{-1}{2v_j}(\underline{x}-\underline{m}_j)^T C_j^{-1}(\underline{x}-\underline{m}_j)};$$

where:
  $m_j$ is the mean vector for class j across all data channels (length N);
  $C_j$ is the covariance matrix for class j across all volumes (dimension N×N);
  $v_j$ is the variance modifier for class $\omega_j$ defined by the user;
  T is the vector transpose operator;
  n(j) is the normalisation factor for Bayesian classification;

The classifier does not make use of the mixture PDF, only the sub-group PDFs. As the mixture PDF is a linear superposition of the sub-group PDFs, the IFC+ simply uses an appropriate book-keeping and class labelling scheme to group result sub-facies classes. At a higher level the IFC+ makes use of colour to visually group the sub-facies under the labelled facies.

Figure 16:
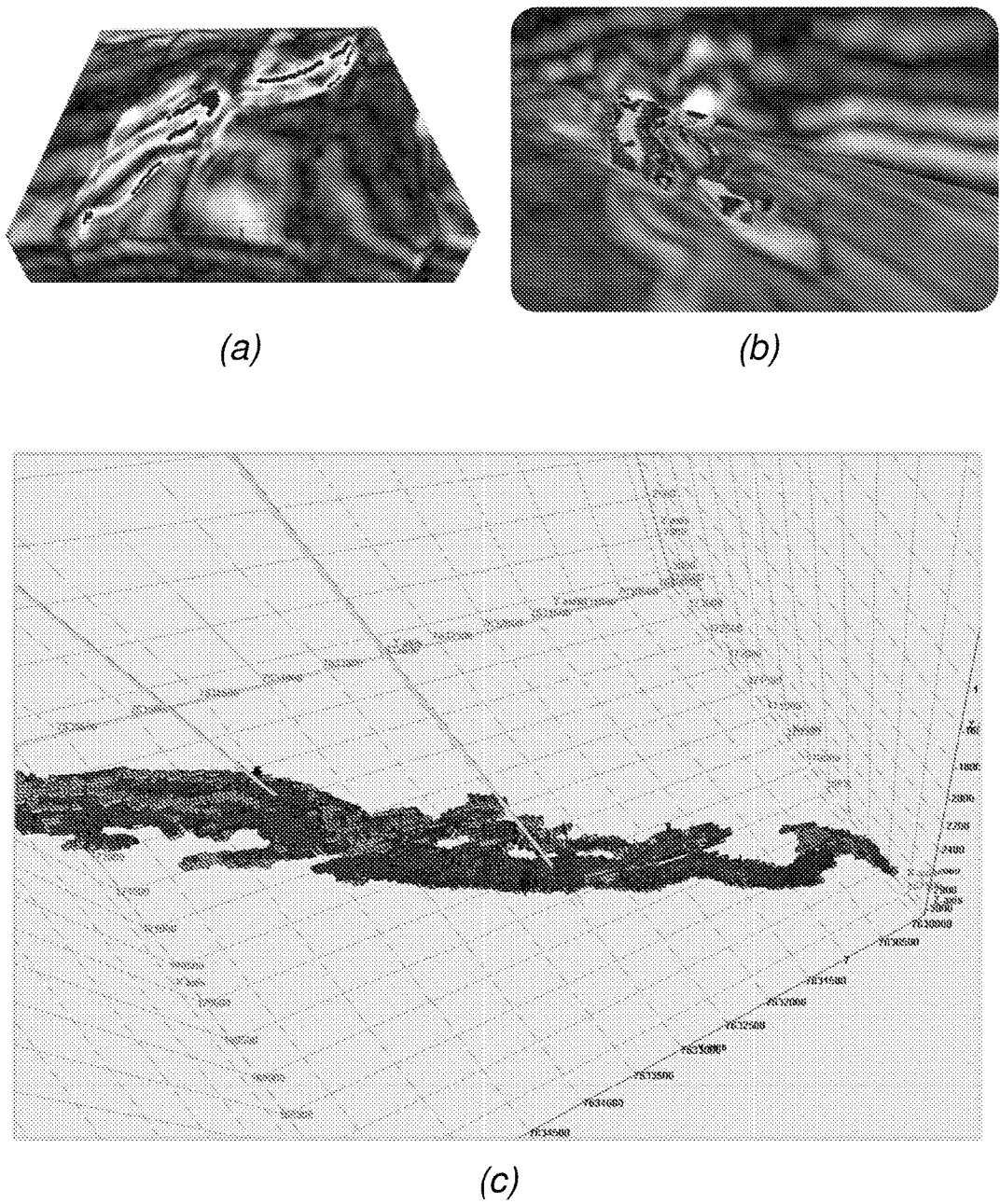
FIG. 16 shows example illustrations of (a) HDFD colour blend volume with geological features illuminated within the seismic data, (b) of the vertical resolution provided in the HDFD colour blend volume, and (c) a structural model generated in a Geo Modelling Package having a finer grid resolution within the channel so that the classification and channel shape are preserved.

FIGS. 16 (a) and (b) show examples of HDFD colour blend volumes used as input for a facies classifier (e.g. IFC+) to generate a facies classification dataset that is utilised in a Geo Modelling Package where a structural model is generated. FIG. 16 (c) shows an example of a structural model generated in a Geo Modelling Package having a finer grid resolution within the channel so that the classification and channel shape are preserved.

It will be appreciated by persons skilled in the art that the above embodiment has been described by way of example only and not in any limitative sense, and that various alterations and modifications are possible without departing from the scope of the invention as defined by the appended claims.

APPENDIX
I—HIGH-DEFINITION-FREQUENCY-DECOMPOSITION (HDFD)

The HDFD algorithm evolved from a Matching Pursuit variant into a multi-iterative technique, interleaving iterations of matching and of deterministic optimisation. Here, a single residue matching iteration is applied after the first round of matching and optimisation in order to fill in gaps left by the earlier matching. This allows the algorithm to obtain a high percentage of the trace energy within the decomposition without resorting to simply matching more and more atoms to arbitrary trace residues purely for the purpose of reducing the residual energy. The steps involved in the HDFD seismic trace decomposition process include "wavelet matching", where atoms are matched at envelope peaks, "atom optimisation" and "over-estimation-reduction", where trace residue energy is reduced, "residue wavelet matching", where atoms are matched at envelope peaks of residue trace, another "atom optimisation" to reduce trace residue energy even further, and a "reconstruction" of the data.

The Individual Steps of the Process are:
Calculating a seismic trace envelope and finding its peaks and troughs;
Dividing the trace into non-overlapping sections delineated by envelope troughs;
Within each section, take the dot product of every complex dictionary wavelet (each frequency) with the real-valued seismic section;
Using quadratic interpolation over the dot products will find the best fitting wavelet frequency, and the phase is determined from the real and complex values of the best dot product value;

Subtracting the matched atom from the trace section, recalculate envelope over the residue within the same trace section and determine whether sufficient energy was matched;

Adding further atoms by recalculating envelope of the remaining residue from each match, if the matched energy is below threshold recursively, e.g. matching a new atom at the largest peak of the new residue envelope;

The atom amplitudes are allowed to become the variable parameters, while instead certain key points on the trace are "fixed" (i.e. peaks or troughs of either the real or imaginary parts of the analytic trace). This process results in a number of alternative (amplitude) parameters being suggested for the atoms in question in addition to their current parameters. The parameter set that lowers the objective function the most is then selected. Two different objective functions for optimisation are used within the HDFD process. For the first optimisation pass after matching, the objective function is simply calculated as the trace residue energy so the aim is the same as for Matching Pursuit: to minimise residual energy left by matched atoms.

The First Optimisation Iteration Method Includes the Following Steps:

Choosing up to three atoms contributing to bad matching locations;

Calculating four alternative atom pairs/trios based on fixing different combinations of peaks and troughs within the overlapping section of either the real or imaginary parts of the analytic seismic trace and varying the atom amplitudes;

Choosing the best out of the five atom combinations (including the original), based on the criterion of minimising the residual energy, to replace the original atoms;

Recursively repeating the process across the whole trace until every section of the trace has been (attempted to be) optimised.

APPENDIX II—BACKGROUND INFORMATION ON GABOR WAVELETS FOR USE IN HDFD

The HDFD uses Gabor Wavelets as follows:

$$f(t) = Ae^{-\pi \frac{t^2}{\sigma^2}}$$

$$F(\omega) = A\int_{-\infty}^{+\infty} e^{-\pi \frac{t^2}{\sigma^2}} \cdot e^{-j\omega t} dt$$

$$= A\int_{-\infty}^{+\infty} e^{-\pi \frac{t^2}{\sigma^2} - j\omega t} dt$$

$$F(\omega) = A\int_{-\infty}^{+\infty} e^{-at^2 + bt} dt$$

$$= Ae^{\frac{b^2}{4a}} \int_{-\infty}^{+\infty} e^{-at^2 + bt - \frac{b^2}{4a}} dt$$

$$= Ae^{\frac{b^2}{4a}} \int_{-\infty}^{+\infty} e^{-\left(t\sqrt{a} - \frac{b}{2\sqrt{a}}\right)^2} dt$$

$$= Ae^{\frac{b^2}{4a}} \sqrt{\frac{\pi}{a}}$$

$$= A\sigma e^{-\frac{\sigma^2 \omega^2}{4\pi}}$$

-continued $$F(k) = A\sigma e^{-\pi \sigma^2 k^2}$$

$$= A\sigma e^{-\pi(\sigma k)^2}$$

$$f(t) = Ae^{-\pi \frac{t^2}{\sigma^2}} \cdot e^{j\omega_0 t} \leftrightarrow F(\omega - \omega_0) = A\sigma e^{-\frac{\sigma^2}{4\pi}(\omega - \omega_0)^2}$$

$$f(t) = Ae^{-\pi \frac{t^2}{\sigma^2}} \cdot e^{\frac{j2\pi t}{\sigma}} \leftrightarrow F\left(k - \frac{1}{\sigma}\right) = A\sigma e^{-\pi(\sigma k - 1)^2}$$

The invention claimed is:

1. A computer implemented method for adaptively determining a plurality of sedimentary facies from 3D seismic data, comprising the steps of:
    (a) generating an attribute volume comprising at least one attribute from said 3D seismic data;
    (b) generating at least one high-definition-frequency-decomposition (HDFD) color blend volume from said 3D seismic data;
    (c) generating a geobody volume comprising at least one geological object using data input from said attribute volume and said high-definition-frequency-decomposition (HDFD) color blend volume;
    (d) generating a facies classification model dataset for a predetermined region of interest of said 3D seismic data, applying a probabilistic algorithm to said facies classification model dataset, and utilizing data from said geobody volume and said frequency decomposition color blend volume as constraints within said at least one geological object;
    (e) selectively adjusting at least one first model parameter, so as to optimize said facies classification model dataset in accordance with a conceptual geological model, wherein said at least one first model parameter is an acceptance threshold and/or a number of predefined sub-facies;
    (f) selectively providing said facies classification model dataset in a representative property model of said region of interest of said 3D seismic data comprising a cellular frame at a resolution corresponding to the resolution of said facies classification model dataset.

2. A method according to claim 1, wherein step (d) further includes selectively utilizing at least one additional predetermined constraint at at least one predetermined position within said predetermined region of interest.

3. A method according to claim 2, wherein said at least one additional predetermined constraint comprises at least one first well log dataset spatially corresponding to and adapted to be interlinked with respective data of said geobody volume.

4. A method according to claim 3, wherein said at least one first well log dataset comprises a plurality of first well markers adapted to define predetermined time-domain intervals and/or lateral intervals and/or lateral intervals with respect to a subsurface within said region of interest.

5. A method according to claim 1, wherein said facies classification model dataset is sampled at a time-domain resolution corresponding to the time-domain resolution of said 3D seismic data.

6. A method according to claim 1, wherein step (c) further includes selectively altering said at least one attribute of said attribute volume, so as to optimize the visual representation of said geobody volume.

7. A method according to claim 1, wherein said at least one geological object is any one or any combination of a geobody, a horizon, a fault, and any other suitable planar geological feature derivable from said 3D seismic data.

8. A method according to claim 1, wherein said probabilistic algorithm comprises any one of a Gaussian Mixture Model, Akaike Information Criterion and Hierarchical Clustering.

9. A computer system for adaptively determining a plurality of sedimentary facies from 3D seismic data which performs a method comprising:
  (a) generating an attribute volume comprising at least one attribute from said 3D seismic data;
  (b) generating at least one high-definition-frequency-decomposition (HDFD) color blend volume from said 3D seismic data;
  (c) generating a geobody volume comprising at least one geological object using data input from said attribute volume and said high-definition-frequency-decomposition (HDFD) color blend volume;
  (d) generating a facies classification model dataset for a predetermined region of interest of said 3D seismic data, applying a probabilistic algorithm to said facies classification model dataset, and utilizing data from said geobody volume and said frequency decomposition color blend volume as constraints within said at least one geological object;
  (e) selectively adjusting at least one first model parameter, so as to optimize said facies classification model dataset in accordance with a conceptual geological model, wherein said at least one first model parameter is an acceptance threshold and/or a number of predefined sub-facies;
  (f) selectively providing said facies classification model dataset in a representative property model of said region of interest of said 3D seismic data comprising a cellular frame at a resolution corresponding to the resolution of said facies classification model dataset.

10. A computer readable storage medium having embodied thereon a computer program, which when executed by a computer processor causes the computer processor to perform a method comprising:
  (a) generating an attribute volume comprising at least one attribute from said 3D seismic data;
  (b) generating at least one high-definition-frequency-decomposition (HDFD) color blend volume from said 3D seismic data;
  (c) generating a geobody volume comprising at least one geological object using data input from said attribute volume and said high-definition-frequency-decomposition (HDFD) color blend volume;
  (d) generating a facies classification model dataset for a predetermined region of interest of said 3D seismic data, applying a probabilistic algorithm to said facies classification model dataset, and utilizing data from said geobody volume and said frequency decomposition color blend volume as constraints within said at least one geological object;
  (e) selectively adjusting at least one first model parameter, so as to optimize said facies classification model dataset in accordance with a conceptual geological model, wherein said at least one first model parameter is an acceptance threshold and/or a number of predefined sub-facies;
  (f) selectively providing said facies classification model dataset in a representative property model of said region of interest of said 3D seismic data comprising a cellular frame at a resolution corresponding to the resolution of said facies classification model dataset.

* * * * *